United States Patent
Heath et al.

(10) Patent No.: US 9,683,681 B2
(45) Date of Patent: *Jun. 20, 2017

(54) LATERAL SWAY BRACE

(71) Applicant: Cooper Technologies Company, Houston, TX (US)

(72) Inventors: Richard W. Heath, Houston, TX (US); Dallas Martin Dworak, Jr., Houston, TX (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/197,062

(22) Filed: Mar. 4, 2014

(65) Prior Publication Data
US 2015/0252915 A1 Sep. 10, 2015

(51) Int. Cl.
| F16L 3/133 | (2006.01) |
| F16L 3/04 | (2006.01) |
| F16L 3/08 | (2006.01) |
| F16L 3/20 | (2006.01) |
| F16L 3/12 | (2006.01) |

(52) U.S. Cl.
CPC ......... *F16L 3/133* (2013.01); *F16L 3/08* (2013.01); *F16L 3/20* (2013.01); *F16L 3/04* (2013.01); *F16L 3/1226* (2013.01)

(58) Field of Classification Search
CPC ..... F16L 3/00; F16L 3/003; F16L 3/08; F16L 3/02; F16L 3/04; F16L 3/1226; F16L 3/133
USPC ......... 52/167.3; 248/226.11, 65, 68.1, 228.1, 248/58, 62, 74.1, 229.15, 229.25
See application file for complete search history.

(56) References Cited

U.S. PATENT DOCUMENTS

| 1,987,826 A * | 1/1935 | Heumann ........................ 403/73 |
| 2,004,462 A * | 6/1935 | Bush .............................. 249/42 |
| 2,110,037 A * | 3/1938 | De Rosa ....................... 248/104 |

(Continued)

FOREIGN PATENT DOCUMENTS

KR  100881971 B1  2/2009

OTHER PUBLICATIONS

ERICO International Corporation; Lateral Bracing Easy Universal Sway Brace (CSBEZU) Shown with Universal Structural Attachment (CSBUNIV); Application Drawing; 2011; 6 pages; ERICO International Corporation.

(Continued)

*Primary Examiner* — Phi A
(74) *Attorney, Agent, or Firm* — Senniger Powers LLP

(57) ABSTRACT

A lateral sway brace is disclosed for bracing a service pipe disposed at a predetermined distance from a building support. The lateral sway brace can include a pipe coupler securable to the service pipe and a brace coupler securable to a brace member. The brace coupler and the pipe coupler are operable with the brace member to laterally support the service pipe from the building support. The brace member has a length less than the predetermined distance between the service pipe and the building support. The lateral sway brace can also include a length adjustment mechanism operable with the brace coupler and facilitating a variable length to accommodate a difference between the predetermined distance between the service pipe and the building support and the length of the brace member.

13 Claims, 8 Drawing Sheets

(56) References Cited

U.S. PATENT DOCUMENTS

| | | | | |
|---|---|---|---|---|
| 2,444,701 A * | 7/1948 | Ingham | | 248/62 |
| 2,689,995 A * | 9/1954 | Smith | | 285/61 |
| 2,729,412 A * | 1/1956 | Amesbury | | 248/68.1 |
| 2,914,829 A * | 12/1959 | Willemain | | 248/229.15 |
| 2,971,738 A * | 2/1961 | Way | | G10D 13/026 |
| | | | | 248/226.11 |
| 3,132,831 A * | 5/1964 | Stamper | | 248/68.1 |
| 3,146,982 A * | 9/1964 | Budnick | | 248/68.1 |
| 3,199,206 A * | 8/1965 | Snapp | | 33/194 |
| 3,327,983 A * | 6/1967 | Snapp | | E04F 21/0015 |
| | | | | 248/200.1 |
| 3,493,206 A * | 2/1970 | Albro | | 248/59 |
| 3,769,774 A * | 11/1973 | Barnes | | 52/698 |
| 3,933,377 A | 1/1976 | Arrowood | | |
| 4,065,218 A * | 12/1977 | Biggane | | 403/71 |
| 4,078,752 A * | 3/1978 | Kindorf | | F16L 3/00 |
| | | | | 248/354.4 |
| 4,141,524 A * | 2/1979 | Corvese, Jr. | | A61G 7/0503 |
| | | | | 128/DIG. 26 |
| 4,417,426 A * | 11/1983 | Meng | | 52/126.7 |
| 4,577,837 A * | 3/1986 | Berg et al. | | 254/212 |
| 4,697,770 A * | 10/1987 | Kirschner | | F16L 3/02 |
| | | | | 248/62 |
| 5,004,193 A * | 4/1991 | Kirschner | | 248/59 |
| 5,022,624 A * | 6/1991 | Hill | | 248/274.1 |
| 5,145,132 A * | 9/1992 | Kirschner | | 248/59 |
| 5,188,317 A * | 2/1993 | Roth | | 248/59 |
| 5,221,064 A * | 6/1993 | Hodges | | 248/59 |
| 5,295,646 A * | 3/1994 | Roth | | 248/58 |
| 5,295,647 A * | 3/1994 | Weidler | | 248/62 |
| 5,344,108 A | 9/1994 | Heath | | |
| 5,351,926 A * | 10/1994 | Moses | | 248/354.5 |
| 5,443,232 A * | 8/1995 | Kesinger et al. | | 248/62 |
| 5,657,884 A * | 8/1997 | Zilincar, III | | A47F 5/0043 |
| | | | | 211/103 |
| 5,687,938 A * | 11/1997 | Bailey | | F16L 3/1226 |
| | | | | 24/277 |
| 5,702,077 A | 12/1997 | Heath | | |
| 5,769,112 A * | 6/1998 | Rendina | | 137/316 |
| 6,110,182 A * | 8/2000 | Mowlai-Ashtiani | | A61B 19/201 |
| | | | | 600/417 |
| 6,508,441 B1 * | 1/2003 | Kirschner | | 248/62 |
| 6,916,000 B2 * | 7/2005 | Weiss | | A61F 9/0017 |
| | | | | 248/125.1 |
| 7,140,579 B2 * | 11/2006 | Kirschner | | 248/74.1 |
| 7,325,776 B2 | 2/2008 | Shibuya | | |
| 7,753,844 B2 * | 7/2010 | Sharratt | | A61B 17/0206 |
| | | | | 600/201 |
| 7,793,401 B2 * | 9/2010 | McKinney | | 29/464 |
| 7,819,371 B2 | 10/2010 | Panasik et al. | | |
| 7,971,838 B2 * | 7/2011 | Osborn et al. | | 248/228.1 |
| 8,100,368 B2 | 1/2012 | Jackson et al. | | |
| 8,534,625 B2 * | 9/2013 | Heath et al. | | 248/226.11 |
| 8,726,607 B1 * | 5/2014 | Kirschner | | 52/713 |
| 2004/0056156 A1 * | 3/2004 | Dodson | | 248/59 |
| 2005/0230569 A1 * | 10/2005 | Kirschner | | 248/74.1 |
| 2008/0251651 A1 * | 10/2008 | Jackson et al. | | 248/62 |
| 2009/0183443 A1 * | 7/2009 | Osborn et al. | | 52/167.3 |
| 2010/0314502 A1 | 12/2010 | Miles et al. | | |
| 2013/0214098 A1 | 8/2013 | Greenfield | | |

OTHER PUBLICATIONS

ERICO International Corporation; "Lateral Bracing Standard Universal Sway Brace (CSBTU) Shown with Universal Structural Attachment (CSBUNIV)"; Application Drawing: 2011; 6 pages; ERICO International Corporation.

TOLCO; "Pipe Clamp for Sway Bracing"; Oct. 15, 2008; 1 page; Tolco.

U.S. Appl. No. 14/197,112, filed Mar. 4, 2014; Richard W. Heath.

U.S. Appl. No. 14/197,112, filed Mar. 4, 2014; Richard W. Heath; office action Feb. 27, 2015.

\* cited by examiner

FIG. 4A  FIG. 4B

LATERAL SWAY BRACE

BACKGROUND

There is a multitude of products in the market utilized by building and plumbing contractors for bracing and supporting pipes, ducts, sprinkler systems, or other types of service pipes from ceilings, walls, or and beams. These products include clamps, braces, hooks, straps, plates, brackets, among other items. There are various types of braces, for example, pipes, channels and angle irons, with pipes being the most commonly used. Typically, one end of a bracing pipe is connected to a ceiling, a wall, or a beam. The other end of the bracing pipe is attached to the service pipe utilizing, for example, a clamp or a bracket securing the service pipe to a side of the bracing pipe.

The manner of this connection between the service pipe and the bracing pipe and the components used are important in determining not only the load-carrying capacity of the brace but also influence the time and labor expended in installing the brace.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 4A-4C are example illustration of aspects of the lateral sway brace of FIG. 3.

Figure 1:
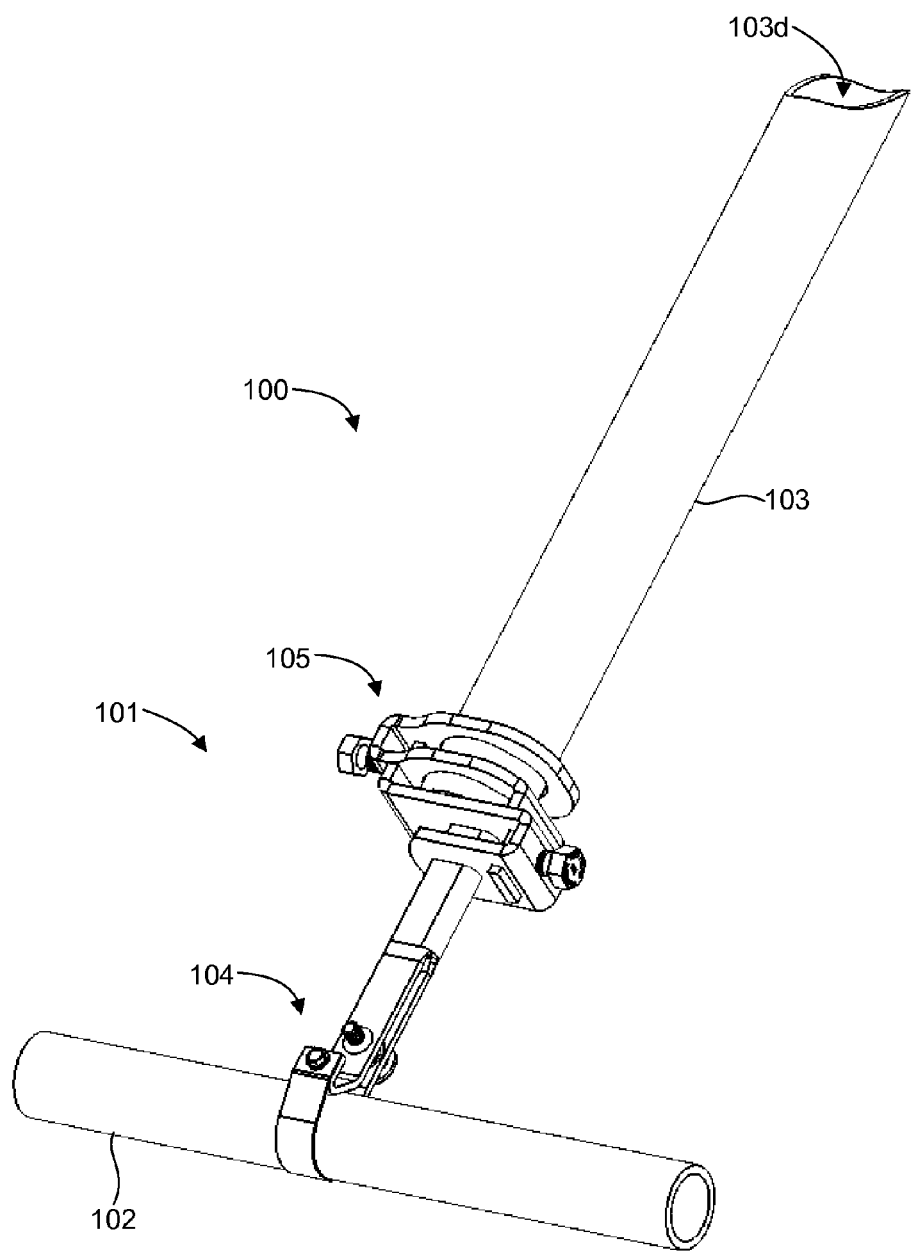
FIGS. 1 and 2 are example illustrations of a lateral sway brace system, in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although some brace configurations can provide adequate load capacity, there is often a lack of adjustability to accommodate a range of bracing pipe lengths and sizes. Some configurations that can accommodate a range of bracing pipe lengths and sizes do so at the expense of burdensome load capacity analysis and use of excess material.

Accordingly, a lateral sway brace is disclosed for bracing a service pipe. The lateral sway brace can include a pipe coupler securable to the service pipe and a brace coupler securable to a brace member. The brace coupler and the pipe coupler are operable with the brace member to laterally support the service pipe from the building support.

The service pipe can be intended and caused to be disposed or braced at a supported or predetermined distance from a building support. The lateral sway brace can accommodate a difference between the predetermined distance and a length of the brace member. Indeed, the brace member can comprise a length less than the needed predetermined distance to brace or support the service pipe from the building support. As such, the lateral sway brace can also comprise a length adjustment mechanism operable with the brace coupler to facilitate a variable length within the sway brace to accommodate a difference between the predetermined distance and the length of the brace member. Stated differently, the lateral sway brace, by way of its length adjustment mechanism, can be installed or secured to a service pipe, and then length adjusted to reach or extend to and secure to an end of a brace member secured to a building support, the brace member having a length less than the predetermined length, or having an end terminating at a distance so as to leave a gap between the end of the brace member and the service pipe. Of course, those skilled in the art will recognize that the sway brace can first be secured to or installed about the brace member as secured to a building support, and then length adjusted to be installed or secured to the service pipe.

Furthermore, the lateral sway brace can position the service pipe and the brace member such that a longitudinal axis of the brace member intersects or is tangent to the service pipe, which can simplify load capacity calculations and reduce material used by being subject to reduced stress compared to typical configurations.

In one aspect, a lateral sway brace system for bracing a service pipe is disclosed. The system can comprise a service pipe disposed at a predetermined distance from a building support and a brace member coupled to a building support. The brace member has a length less than the predetermined distance between the service pipe and the building support. The system can also comprise a lateral sway brace, which can include a pipe coupler securable to the service pipe and a brace coupler securable to a brace member. The brace coupler and the pipe coupler are operable with the brace member to laterally support the service pipe from the building support. The lateral sway brace can also comprise a length adjustment mechanism operable with the brace coupler to facilitate a variable length to accommodate a difference between the predetermined distance between the service pipe and the building support and the length of the brace member.

Figure 2:
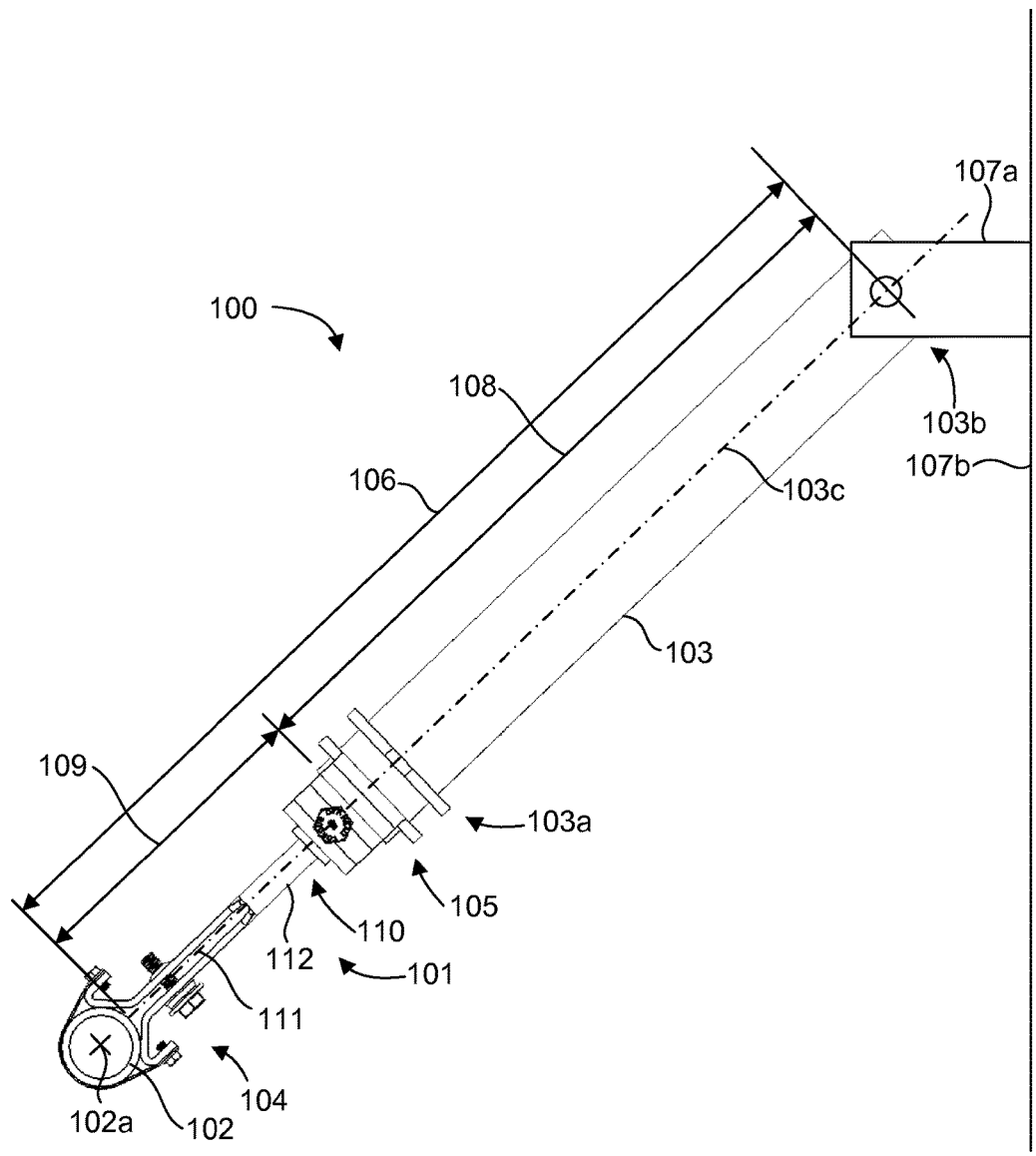

One embodiment of a lateral sway brace system 100 for bracing a service pipe is illustrated in FIGS. 1 and 2. In general, the lateral sway brace system 100 can comprise a lateral sway brace 101, a service pipe 102, and a brace member 103. The service pipe 102 can be any service pipe found in a building, such as a water pipe, a drain pipe, etc. and can therefore be constructed of any suitable material, such as a polymer or a metal. The brace member 103 can be any structural member suitable to provide support for the service pipe for a given loading condition, such as seismic loading. Accordingly, the brace member 103 can comprise a pipe, a strut, a rod, a beam, a bar, or combinations thereof.

The lateral sway brace 101 can include a pipe coupler 104 securable to the service pipe 102 and a brace coupler 105 securable to the brace member 103 to couple the service pipe 102 to the brace member 103. In one aspect, the brace coupler 105 and the pipe coupler 104 can be operable with the brace member 103 to laterally support the service pipe 102, or to support the service pipe 102 in a lateral arrangement, from a building support 107a, 107b. Examples of different types of lateral sway braces and associated service pipe couplers are described in U.S. patent application Ser. No. 14/197,112, filed Mar. 4, 2014, and entitled "Lateral Sway Brace", which application is incorporated by reference in its entirety herein.

With particular reference to FIG. 2, the service pipe 102 can be disposed at a predetermined distance 106 from the building support and the brace member 103 can be coupled to the building support. The building support can include a coupling device or mounting bracket 107a for coupling the brace member 103 to a wall 107b, ceiling, or any other structural feature of a building suitable for providing support for the service pipe 102. In some embodiments, a building support can include the wall 107b, ceiling, or other structural feature of a building. In general, the service pipe 102 is disposed, or is to be disposed, at some distance 106 from the mounting bracket 107a, the wall 107b, ceiling, or other building support and the present disclosure provides devices, systems, and methods for securing and supporting the service pipe from the building support, particularly when an effective length 108 of the brace member 103 is less than the distance 106 from the building support 107a, 107b to the service pipe 102.

As described herein, the lateral sway brace 101 can include a length adjustment mechanism 110 operable with the brace coupler 105 to facilitate or provide a variable length of the sway brace between the service pipe 102 and the brace member 103 to accommodate a gap or distance 109 between an end of the brace member 103 and the service pipe 102. Adjustability can therefore be achieved within the lateral sway brace 101 to accommodate variable gaps possibly caused by brace members 103 of different length. In one aspect, the length 108 of the brace member 103 can vary to a certain degree from what may be an ideal or exact length, such as between about 1 inch to about 12 inches in a non-limiting example, with the sway brace 101 being able to adjust and account for or absorb such differences and maintain a proper or desired distance 106 of the service pipe 102 from the building support 107a, 107b. In a particular aspect, a length adjustment of the lateral sway brace 101 can be used to tune and fine tune adjustment once the length 108 of the brace member 103 is within and acceptable range of adjustability of the lateral sway brace 101. One potential benefit of the adjustable length of the sway brace 101 is reduced time and effort for installation because the length 108 of the brace member 103 need not be precise. As will be apparent from the present disclosure, the installation time can also be reduced due to the ease and simplicity of installing the lateral sway brace and adjusting an effective length of the sway brace to accommodate or match the gap 109 between the brace member 103 and the service pipe 102.

The brace coupler 105 can be configured to secure the pipe coupler 104 and/or length adjustment mechanism 110 to the brace member 103. In one embodiment, the length adjustment mechanism 110 can be securable to an end 103a of the brace member 103 proximate the service pipe 102.

The length adjustment mechanism 110 can comprise an extension member 112. The extension member 112 can be part of the pipe coupler 104 or the brace coupler 105, or it can be a separate component. In some embodiments, the lateral sway brace 101 can be configured such that a longitudinal axis 111 of the extension member 112 and/or a longitudinal axis 103c of the brace member 103 can intersect or be tangent to the service pipe 102 as retained by the pipe coupler 104. In one specific embodiment, the longitudinal axis 111 of the extension member 112 and the longitudinal axis 103c of the brace member 103 can be coaxial and can intersect a longitudinal axis 102a of the service pipe 102. Thus, the sway brace 101 can be configured to align the longitudinal axis 111 of the extension member 112 with the longitudinal axis 103c of the brace member 103. Such alignments can provide benefits under certain loading conditions, such as seismic loading. For example, this can lead to a load path through the various components of the system 100 that primarily loads the service pipe in tension and/or compression, while minimizing or eliminating moment loading on the service pipe. Such a condition can be beneficial for analyzing the system 100 under a given loading condition and can lead to a sway brace having less material, which can further reduce costs.

Figure 3:
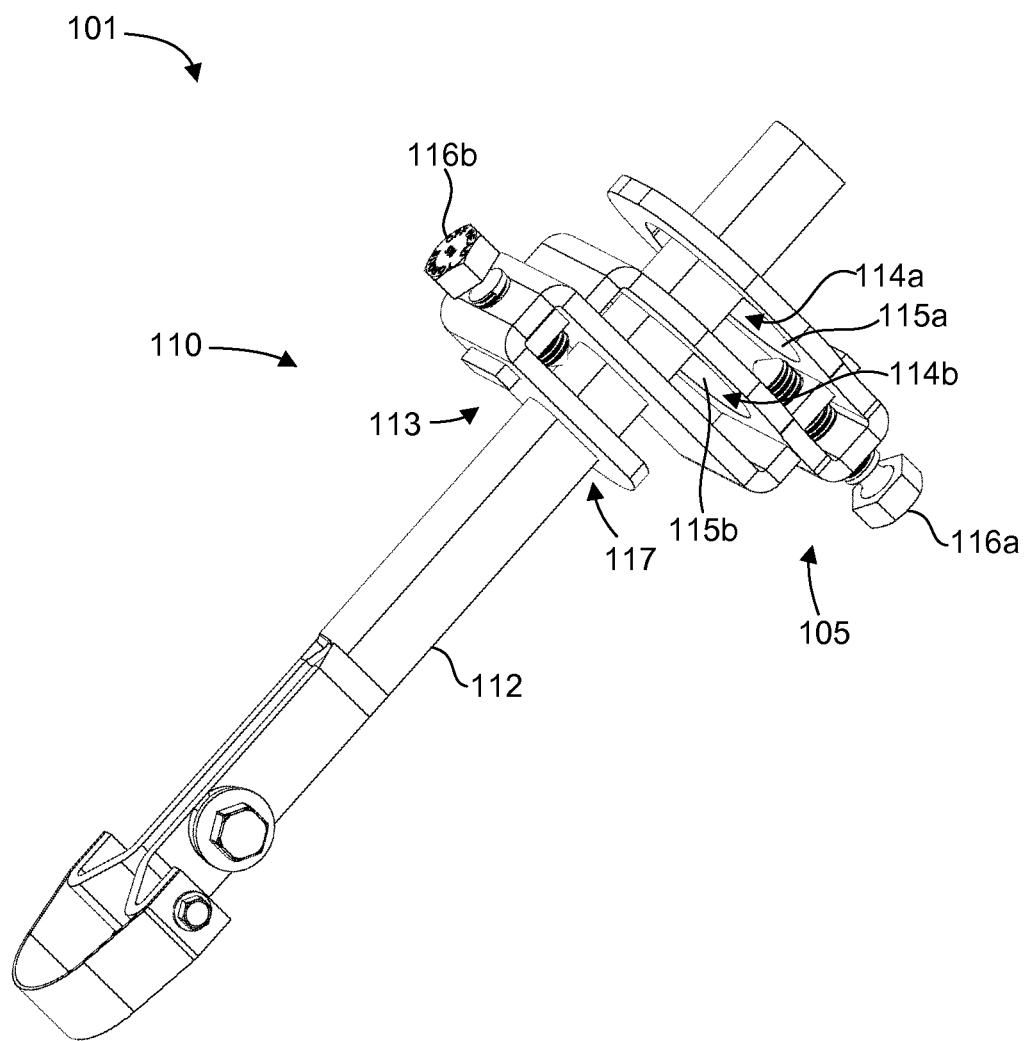
FIG. 3 is an example illustration of a lateral sway brace of the system of FIGS. 1 and 2.
Figure 4C:
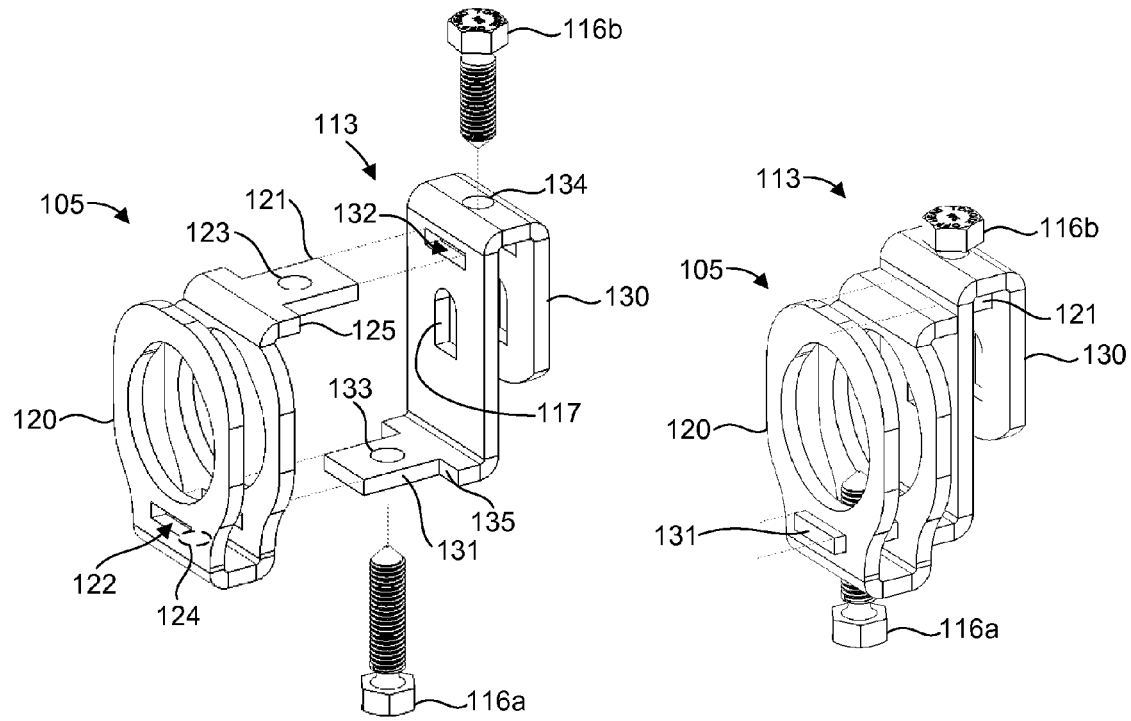
Figure 4C:
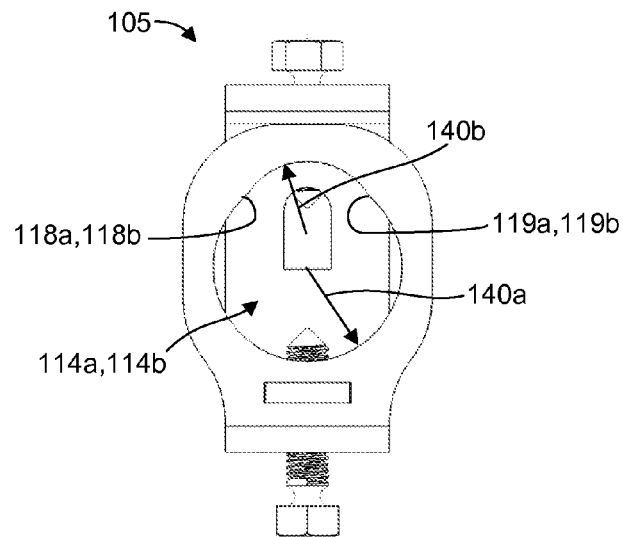

With reference to FIGS. 3-4C, and continued reference to FIGS. 1 and 2, certain features of the sway brace 101 are shown, with the service pipe 102 and the brace member 103 being omitted in FIG. 3 for clarity. For example, the brace coupler 105 can comprise an opening 114a, 114b configured to receive at least a portion of the brace member 103. In this case, an end of the brace member 103 can extend into the opening 114a, 114b such that an outer surface or wall of the brace member 103 can interface with a side 115a, 115b of the opening 114a, 114b, respectively, to secure the brace coupler 105 about the end of the brace member 103. The brace coupler 105 can also support a bolt 116a operable to engage the brace member 103 and secure the brace member 103 against the side 115a, 115b of the opening 114a, 114b. Thus, the brace coupler 105 and the sway brace 101 can be coupled to the brace member 103 by inserting the end of the brace member 103 into the opening 114a, 114b of the brace coupler 105, positioning the brace coupler 105 about the brace member 103, and tightening the bolt 116a against the brace member 103.

In addition, the length adjustment mechanism 110 of the lateral sway brace 101 can include or be operable with an extension member 112 and an extension member securing portion 113, these being operable to vary the effective length of the extension member in order to accommodate or match the difference between the predetermined distance 109 between the service pipe 102 and the brace member 103. For example, the length adjustment mechanism 110 can include an extension member securing portion 113, operable with (e.g., that couples to or otherwise interfaces with) the brace coupler 105, having an opening 117 configured to receive the extension member 112, such that the extension member securing portion 113 and the extension member 112 are slideable relative to one another to achieve an infinite number of adjustment positions along the length of the extension member 112. In one exemplary embodiment, the extension member 112 can comprise a U-shaped cross-sectional configuration with the opening 117 being configured to receive the extension member 112, the opening having a similar cross-sectional configuration. The length adjustment mechanism 110 can also support a bolt 116b operable to engage the extension member 112 and secure the extension member 112 against a side (hidden from view) of the opening 117. Thus, the length of the sway brace 101 can be adjusted by moving or sliding the extension member 112 within the opening 117 of the securing portion 113 (or in other words, moving the length adjustment mechanism 110 about the extension member 112) and tightening the bolt 116b against the extension member 112.

In some embodiments, the brace member 103 can have an opening 103d that can be accessible at an end, such as with a hollow tube or cylinder (e.g., a pipe). In this case, the extension member securing portion 113 can position at least a portion of the extension member 112 in the opening 103d and inside of the brace member 103, for example by facilitating positioning of the extension member 112 such that the extension member 112 extends toward the brace member 103 beyond the brace coupler 105 and through the opening 103d of the brace member 103. Such an arrangement can facilitate a greater range of adjustment. Thus, in one aspect, the brace coupler 105 can be positioned about the extension member 112 to facilitate and even enhance the length adjustment.

In one aspect, an extension member itself can be adjustable, such as by having at least two components that are movable relative to one another, such as a telescoping or side-by-side configuration. It should be recognized, that an extension member can be configured sufficient to withstand loads or operating conditions to which it may be subjected, and can therefore function as part of a suitable sway brace for an intended purpose, such as seismic loading.

FIGS. 4A-4C illustrate in greater detail several aspects of the brace coupler 105 and the extension member securing portion 113 shown in FIGS. 1-3. The embodiments illustrated depict the brace coupler 105 as comprising a brace coupler bracket 120 and the extension member securing portion 113 as comprising a separate securing portion bracket 130. The brackets 120, 130 can interface with and be coupled to one another using tabs 121, 131, associated with the brackets 120, 130, respectively. Each of the brackets 120, 130 can include an opening 122, 132, respectively, configured to receive a tab. Thus, to assemble, the tab 121 can be inserted into opening 132, and tab 131 can be inserted into opening 122. Each of the tabs 121, 131 can also include a hole 123, 133, which can be threaded, sized to receive a bolt. In addition, each of the brackets 120, 130 can also include a hole 124, 134, which can be threaded, sized to receive a bolt. Thus, the bolt 116a can be threaded into hole 124 and/or hole 133, and the bolt 116b can be threaded into hole 134 and/or hole 123 in order to secure the brackets 120, 130 to one another. In one aspect, the brackets 120, 130 can include shoulders 125, 135 formed about tabs 121, 131 configured to facilitate proper positioning or alignment of the brackets 120, 130 and corresponding holes to one another and/or to provide a supportive structural interface to enhance stiffness or stability of the brackets 120, 130 when coupled to one another and subjected to loading as part of the sway brace 101. The shoulders 125, 135 can be configured to seat against a surface of the brackets 120, 130 upon inserting tabs 121, 131 into respective holes 132, 122.

FIG. 4C, in particular, illustrates the openings 114a, 114b of the brace coupler 105 as being defined by at least two different radii 140a, 140b. The different radii 140a, 140b can facilitate coupling with two different sized brace members. In one aspect, the radii 140a, 140b can define the opening 114a, 114b such that the portions of the opening 114a, 114b having the different radii 140a, 140b is sufficient to engage and stably interface with the brace member of a compatible size. In addition, the opening 114a, 114b can include transition surfaces 118a, 118b, 119a, 119b that blend or transition the surfaces defined by the radii 140a, 140b such that no sharp edges exist. This can facilitate ease of assembly of the brace coupler 105 with a brace member sized to fit into the portion of the opening 114a, 114b defined by the radius 140b by enabling the brace member to slide into the appropriate portion of the opening 114a, 114b without impediment by a corner or other potential obstruction.

In one aspect, the brace coupler bracket 120 and the securing portion bracket 130 can be constructed from plate material that has been formed, such as by stamping or cutting, and bent into the configurations illustrated in FIGS. 4A-4C. Thus, this embodiment of a brace coupler 105 and a securing portion 113 can be constructed utilizing manufacturing processes that can yield cost savings over other prior bracing solutions.

It should be noted that the bolt 116a and/or 116b can have a tip, such as a conical or pointed tip, configured to increase contact pressure to locally deform the brace member or the extension member, as applicable, to enhance the engagement with the member. In addition, the bolt 116a and/or 116b can have a head configured to break-off at a given torque in order to ensure that a sufficient torque has been applied during assembly. Furthermore, the brackets 120, 130 can be configured such that the holes that receive and support the bolts 116a, 116b are formed on an incline to orient the bolts 116a, 116b on an incline relative to the extension member 112 and the brace member 103 in a manner so as to cause the bolts 116a, 116b to have a tendency to apply an increased force on or about the extension member 112 and the brace member 103 when these are subjected to forces having a tendency to cause the brackets 120, 130 to slide relative to them (e.g., during a seismic loading event).

FIGS. 5A-6B illustrate aspects of another embodiment of a lateral sway brace 201, in accordance with the present disclosure. As with other lateral sway braces disclosed herein, the lateral sway brace 201 can include a pipe coupler 204, a brace coupler 205, and a length adjustment mechanism 210. It will be apparent that the lateral sway brace 201 can, in general, include similar components and/or elements that can have similar attributes as other lateral sway braces disclosed herein.

Figure 5A:
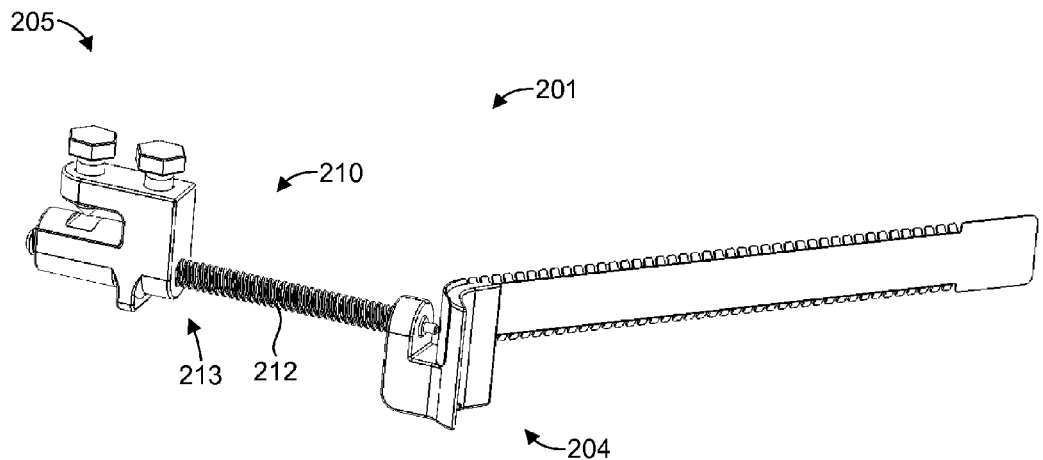
FIGS. 5A and 5B are example illustrations of a lateral sway brace, in accordance with another embodiment of the present invention.
Figure 5B:
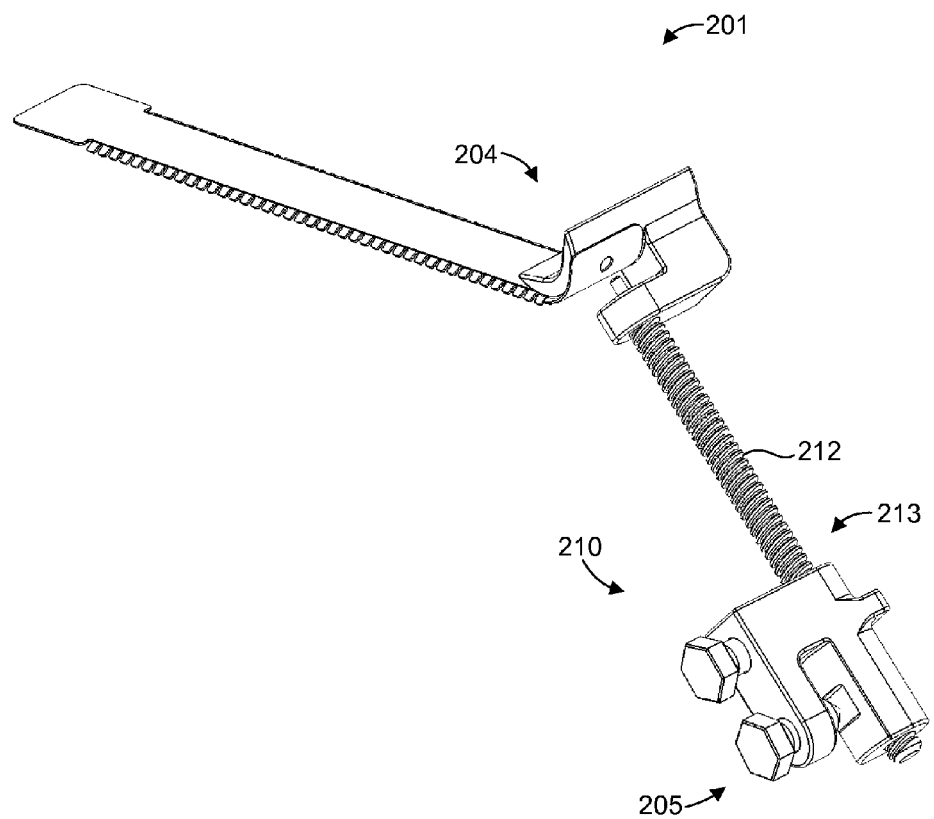
Figure 6A:
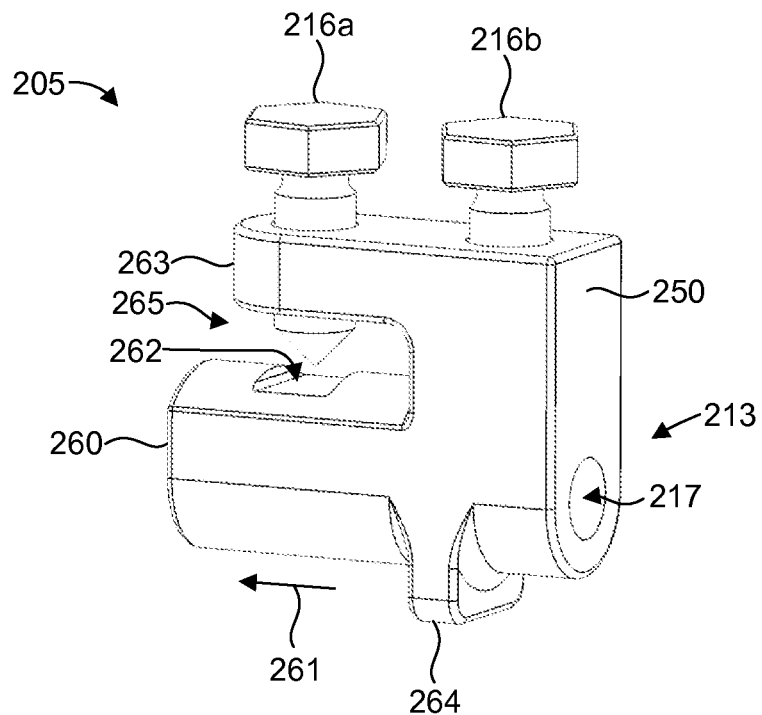
FIGS. 6A and 6B are example illustration of aspects of the lateral sway brace of FIGS. 5A and 5B.
Figure 6B:
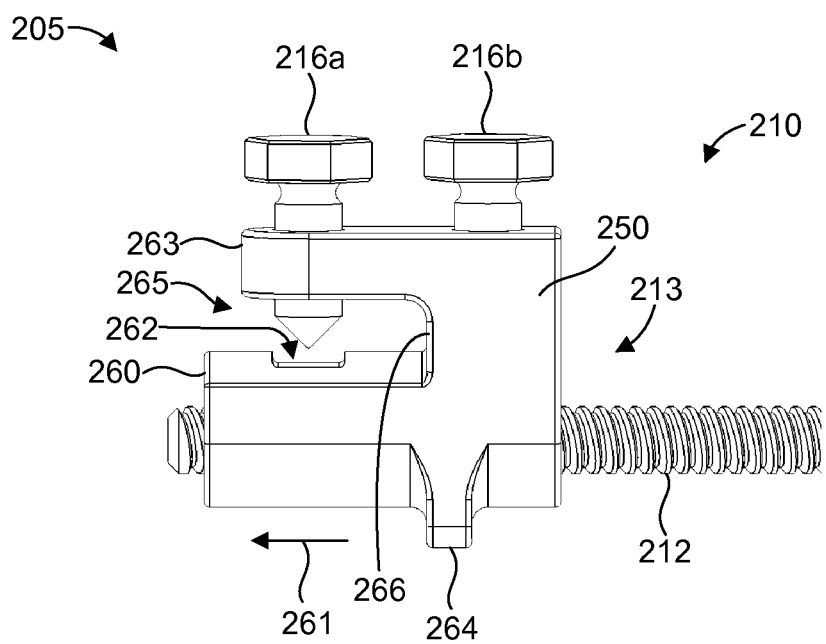

FIGS. 6A and 6B illustrate an embodiment of certain features of the brace coupler 205 and length adjustment mechanism 210 of FIGS. 5A and 5B. For example, the brace coupler 205 can comprise a base portion 250 and a protrusion 260 configured to extend from the base portion 250 into a brace member having an opening accessible from an end, such as with a pipe or hollow cylinder. A bolt 216a can be operable to engage the brace member and secure the brace member against the protrusion 260. The bolt 216a can be supported by an arm 263 also extending from the base portion 250 in the same direction as the protrusion 260, wherein the arm 263 and the protrusion 260 can form or define a channel 265 configured to receive a wall of the brace member. Thus, the sway brace 201 can be coupled to the brace member by inserting the protrusion 260 into the opening of the brace member in direction 261, such that a wall of the brace member is disposed in the channel 265 and optionally seated against the base portion 250, and tightening the bolt 216a against the brace member. The protrusion 260 can comprise a cross-sectional shape of a circle, an oval, a rectangle, a triangle, a U-shape, T-shape, an I-shape, an L-shape, or combinations thereof, or any other shape suitable for insertion into an opening of a brace member, as well as interfacing with an interior surface of the brace member. Thus, with the bolt 216a contacting the wall of the brace member from the outside, and the protrusion 260 contacting the wall of the brace member from the inside, the brace coupler 205 can be securely coupled to the wall of the brace member.

The protrusion 260 can further comprise a void or recess 262 formed in a surface thereof to be in contact with the wall of the brace member. The void or recess 262 can exist in the protrusion 260, such that the bolt 216a can be configured to locally deform a portion of a brace member into the void or recess 262 to create a mechanical interference between the locally deformed portion of the brace member and a region of the protrusion 260 about the void or recess 262. This can provide additional security for the coupling of the brace coupler 205 and the brace member.

The brace coupler 105 can further comprise and incorporate a part of a length adjustment mechanism 210. An extension member securing portion 213 of the length adjustment mechanism 210 can have an opening 217 extending in a direction through the base portion 250 and the protrusion 260 configured to receive the extension member 212, wherein the extension member securing portion 213 and the extension member 212 are moveable relative to one another to provide an infinite number of adjustment positions along the length of the extension member 212. The extension member securing portion 213 can further comprise a bolt 216b operable within another opening in the base portion 250 extending in another direction, the bolt 216b being configured to engage the extension member 212 and secure the extension member 212 against a side of the opening 217. Although the extension member 212 is shown as being a threaded rod where adjustment is effectuated by rotating the extension member 212, in other embodiments the extension member can be free to translate or rotate in the opening 217 to facilitate adjustability until prevented from doing so by the bolt 216b. The bolt 216b can include a protrusion or a pointed tip to interface with or engage the threads of the extension member 212, which can provide further security against unwanted movement of the extension member within the opening 217. Thus, this embodiment includes two bolts, the bolt 216a to secure a brace member and bolt 216b to secure the extension member 212.

The brace coupler 205 can further comprise a tab 264 configured to limit movement of the brace coupler 205 and the corresponding length adjustment mechanism 210 relative to a brace member in at least one direction. For example, the tab 264 can be operable along with a surface 266 at an end of the channel 265 to contact and serve as a stop to an end of a brace member. More specifically, an upper wall of the brace member can be caused to contact the surface 266 and a lower wall of the brace member can be caused to contact the tab 264. These points of contact can serve to align the extension member 212 with the brace member.

FIGS. 7A-8B illustrate aspects of yet another embodiment of a lateral sway brace 301, in accordance with the present disclosure. As with other lateral sway braces disclosed herein, the lateral sway brace 301 can include a pipe coupler 304, a brace coupler 305, and a length adjustment mechanism 310. It will be apparent that the lateral sway brace can, in general, include similar components or elements that can have similar attributes as other lateral sway braces disclosed herein.

In this embodiment, the length adjustment mechanism 310 can comprise an extension member 312 extending from the pipe coupler 304. The length adjustment mechanism 310 can further comprise an extension member securing portion 313 integrally formed or otherwise operable with the brace coupler 305, which extension member securing portion 313 and brace coupler 305 can be configured to be slideable about the extension member 312. The extension member 312 can further comprise an end 350. In one embodiment, the end 350 can be configured to resist or prevent the extension member securing portion 313 and the brace coupler 305 from separating from the extension member 312. For example, a portion of the end 350 of the extension member 312 can be reduced in size or comprise a reduced cross-sectional area to cause interference with the extension member securing portion 313 to prevent an excessive length adjustment that could separate or disengage the extension member 312 from the extension member securing portion 313.

Figure 7A:
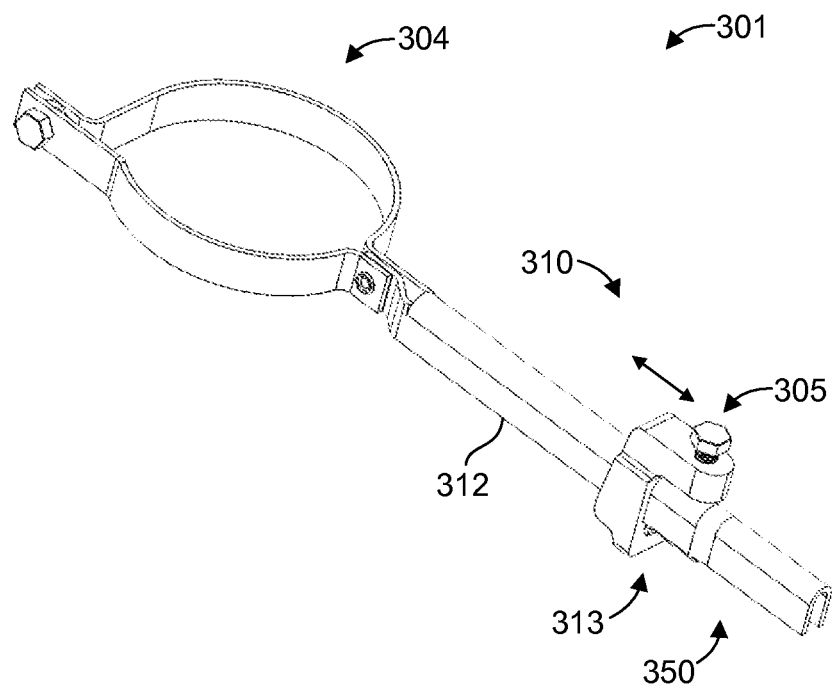
FIGS. 7A and 7B are example illustrations of a lateral sway brace, in accordance with yet another embodiment of the present invention.
Figure 7B:
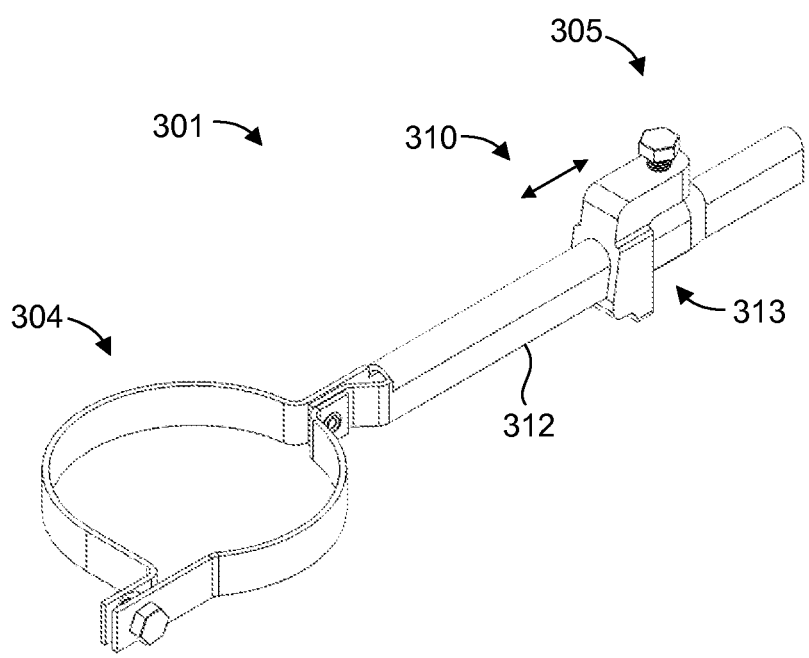
Figure 8A:
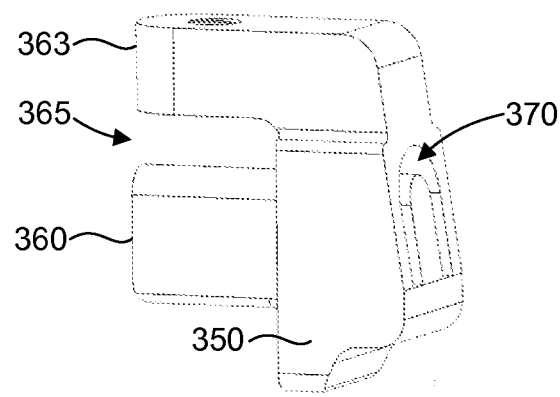
FIGS. 8A and 8B are example illustration of aspects of the lateral sway brace of FIGS. 7A and 7B.
Figure 8B:
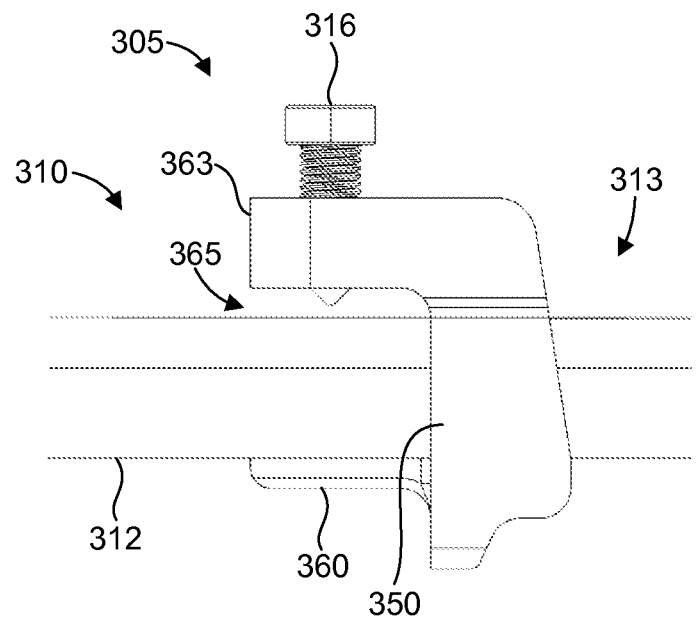

FIGS. 8A and 8B illustrate an embodiment of certain features of the brace coupler 305 and length adjustment mechanism 310 of FIGS. 7A and 7B. For example, the extension member securing portion 313 of the length adjustment mechanism 310 can have an opening 370 formed therein configured to receive the extension member 312, and to facilitate sliding of the extension member securing portion 313 about the extension member 312.

The brace coupler 305 can comprise a protrusion 360 extending from a base 350. The protrusion 350 can be configured to be inserted into an interior portion of a brace member having an opening accessible from an end, such as a pipe or hollow cylinder. In this case, the protrusion 360 can be configured to interface directly with and engage the extension member 312. In one embodiment, the protrusion 360 can comprise a u-shaped configuration that further extends through the base 350 and the extension member securing portion 313. The curved upper surface of the protrusion 360 can be configured to define, at least in part, the opening 370. As such, the extension member 312, having a similar, but slightly larger configuration, can engage and interface with the protrusion 360 as it is being inserted into the opening 370. The protrusion 360 can function to support the extension member 312, as shown. The extension member 312 and the extension member securing portion 313 can be slideable relative to one another to facilitate length adjustment within the sway brace 301, in which an infinite number of adjustment positions are provided.

The brace coupler 305 can further comprise an arm 363 also extending from the base 350, which arm 363 and the protrusion 360 function to form and define a channel 365 that can be configured to receive both the extension member 312 and a wall of a brace member. The arm 363 can support a bolt 316 operable to engage an outer surface of and clamp the brace member. The single bolt 316 can therefore be operable to secure the brace member and the extension member 312 against the protrusion 360. Thus, in this embodiment, certain features of the brace coupler 305 and length adjustment mechanism 310 are integrated with one another.

In accordance with one embodiment of the present invention, a method of facilitating lateral bracing of a service pipe disposed at a predetermined distance from a building support is disclosed. The method can comprise providing, as part of a lateral sway brace, a pipe coupler securable to a service pipe. The method can further comprise providing, as part of the lateral sway brace, a brace coupler securable to a brace member, wherein the brace coupler and the pipe coupler are operable with the brace member to laterally support the service pipe from a building support, and wherein the brace member has a length less than the predetermined distance between the service pipe and the building support. Additionally, the method can comprise facilitating a length adjustment within the lateral sway brace to accommodate a difference between the predetermined distance between the service pipe and the building support and the length of the brace member. As with other methods disclosed herein, no specific order is required in this method, though generally in one embodiment, these method steps can be carried out sequentially.

In one aspect of the method, facilitating a length adjustment within the lateral sway brace comprises providing a length adjustment mechanism.

The method can further comprise facilitating bracing the service pipe relative to the brace member such that a longitudinal axis of the brace member intersects or is tangent to the service pipe.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A lateral sway brace for bracing a service pipe disposed at a predetermined distance from a building support, the lateral sway brace having a length and comprising:
    a pipe coupler at a first longitudinal end of the lateral sway brace, the pipe coupler configured to couple to the service pipe;
    a brace coupler at a second longitudinal end of the lateral sway brace, the brace coupler configured to couple to a brace member; and
    a length adjustment mechanism disposed between the pipe coupled and the brace coupler and configured to allow adjustment of the length of the lateral sway brace, the length adjustment mechanism including
        an extension member coupled to the pipe coupler,
        an extension coupler coupled to the brace coupler, wherein the extension coupler is received on and selectively movable along the extension member, and
        a set screw threadably secured to the extension coupler and configured to selectively lock the extension coupler at a selected longitudinal position on the extension member to inhibit movement of the extension coupler on the extension member and fix the length of the lateral sway brace at a selected length,
    wherein the extension coupler of the length adjustment mechanism comprises a extension coupler bracket including spaced apart, opposing extension coupler legs defining extension-receiving openings, wherein the extension member is slidably received in the extension-receiving openings,
    wherein the extension member has a U-shaped cross section.

2. The lateral sway brace set forth in claim 1, wherein the set screw is disposed between the opposing legs of the extension coupler bracket.

3. The lateral sway brace set forth in claim 2, wherein the brace coupler comprises a brace bracket including spaced apart, opposing brace legs defining brace-receiving openings sized and shaped to receive the brace member.

4. The lateral sway brace set forth in claim 3, wherein the brace coupler comprises a second set screw threadably secured to the brace bracket and configured to selectively lock the brace bracket on the brace member to inhibit movement of the brace bracket on the brace member.

5. The lateral sway brace set forth in claim 4, wherein the second set screw is disposed between the opposing legs of the brace bracket.

6. The lateral sway brace set forth in claim 1, wherein the brace coupler includes a second set screw configured to selectively lock the brace coupler on the brace member to inhibit movement of the brace coupler on the brace member.

7. The lateral sway brace set forth in claim 1, wherein the pipe coupler includes a strap for coupling to the pipe.

8. A lateral sway brace for bracing a service pipe disposed at a predetermined distance from a building support, the lateral sway brace having a length and comprising:
- a pipe coupler at a first longitudinal end of the lateral sway brace, the pipe coupler configured to couple to the service pipe;
- a brace coupler at a second longitudinal end of the lateral sway brace, the brace coupler configured to couple to a brace member; and
- a length adjustment mechanism disposed between the pipe coupled and the brace coupler and configured to allow adjustment of the length of the lateral sway brace, the length adjustment mechanism including
 an extension member coupled to the pipe coupler,
 an extension coupler coupled to the brace coupler, wherein the extension coupler is received on and selectively movable along the extension member, and
 a set screw threadably secured to the extension coupler and configured to selectively lock the extension coupler at a selected longitudinal position on the extension member to inhibit movement of the extension coupler on the extension member and fix the length of the lateral sway brace at a selected length,
 wherein the length adjustment mechanism includes a tab extending outward from the extension coupler, wherein the brace coupler defines a tab-receiving opening, wherein the tab is received in the tab-receiving opening.

9. The lateral sway brace set forth in claim 8, wherein the brace coupler includes a second set screw configured to selectively lock the brace coupler on the brace member to inhibit movement of the brace coupler on the brace member, wherein the second set screw extends through the tab to connect the length adjustment mechanism to the brace coupler.

10. The lateral sway brace set forth in claim 9, wherein the brace coupler includes a second tab, wherein the extension coupler of the length adjustment mechanism defines a second tab-receiving opening, wherein the second tab is received in the second tab-receiving opening.

11. The lateral sway brace set forth in claim 10, wherein the set screw extends through the second tab to connect the brace coupler to the length adjustment mechanism.

12. A lateral sway brace for bracing a service pipe disposed at a predetermined distance from a building support, the lateral sway brace having a length and comprising:
- a pipe coupler at a first longitudinal end of the lateral sway brace, the pipe coupler configured to couple to the service pipe;
- a brace coupler at a second longitudinal end of the lateral sway brace, the brace coupler configured to couple to a brace member; and
- a length adjustment mechanism disposed between the pipe coupled and the brace coupler and configured to allow adjustment of the length of the lateral sway brace, the length adjustment mechanism including
 an extension member coupled to the pipe coupler,
 an extension coupler coupled to the brace coupler, wherein the extension coupler is received on and selectively movable along the extension member, and
 a set screw threadably secured to the extension coupler and configured to selectively lock the extension coupler at a selected longitudinal position on the extension member to inhibit movement of the extension coupler on the extension member and fix the length of the lateral sway brace at a selected length,
 wherein the brace coupler includes a tab, wherein the extension coupler of the length adjustment mechanism defines a tab-receiving opening, wherein the tab is received in the tab-receiving opening.

13. The lateral sway brace set forth in claim 12, wherein the set screw extends through the tab to connect the brace coupler to the length adjustment mechanism.

* * * * *